United States Patent [19]

Imazeki et al.

[11] 4,368,433

[45] Jan. 11, 1983

[54] SIGNAL CONVERTER CIRCUIT

[75] Inventors: Ryoji Imazeki; Etsuo Yamazaki; Takao Sasaki, all of Hachioji, Japan

[73] Assignee: Fujitsu Fanuc Limited, Tokyo, Japan

[21] Appl. No.: 176,336

[22] Filed: Aug. 8, 1980

[30] Foreign Application Priority Data

Aug. 25, 1979 [JP] Japan .................................. 54-108384

[51] Int. Cl.³ .......................... H03K 3/86; H03K 6/00
[52] U.S. Cl. ........................................ 328/30; 328/14; 328/143; 328/186
[58] Field of Search ...................... 328/14, 21, 30, 31, 328/25, 143, 186; 307/221 D

[56] References Cited

U.S. PATENT DOCUMENTS

| | | | |
|---|---|---|---|
| 3,474,260 | 10/1969 | Frohbach | 307/221 D |
| 3,500,215 | 3/1970 | Leuthold et al. | 307/221 D |
| 3,605,023 | 9/1971 | Kline | 328/25 |
| 3,983,493 | 9/1976 | Gladstone | 328/14 |

*Primary Examiner*—John S. Heyman
*Attorney, Agent, or Firm*—Staas & Halsey

[57] ABSTRACT

An input signal is written in n memory elements one after another in accordance with clock pulses, the contents of the n memory elements are added together by an adder, and the added output from the adder is divided by n in a divider, thereby converting an input signal having an abrupt change to a signal having a gentle change.

6 Claims, 3 Drawing Figures

SIGNAL CONVERTER CIRCUIT

BACKGROUND OF THE INVENTION

1. Field of the Invention

The present invention relates to a signal converter circuit which converts a rapidly changing signal to a gently changing signal in numerical control or the like.

2. Description of the Prior Art

In a numerical control machine for numerically controlling a machine tool, a drawing instrument and so forth, it is customary in the art to provide a programmed command value and the current position information of a movable machine part to a microprocessor or the like, wherein they are processed to obtain the amount of movement of the movable machine part for controlling a servo system. In this case, if use is made of a servo system of excellent responsiveness such as a transistor servo or the like, when it is supplied with a signal of a large change in the amount of movement, the movable machine part is moved in a stepwise manner, resulting in vibration.

In order to make such a stepwise movement of the movable machine part as smooth as possible, it is desirable that signals representing small amounts of movement be repeatedly applied to the servo system to obtain a desired amount of movement as a whole, but this requires repeated processing at short time intervals. In the microprocessor or the like, however, the time intervals between individual processing cannot greatly be reduced because of its throughput.

SUMMARY OF THE INVENTION

An object of the present invention is to provide a signal converter circuit which, when supplied with a signal having a large change as mentioned above, converts it to a signal having a small change, thereby to facilitate and ensure highly accurate numerical control.

Briefly stated, the signal converter circuit of the present invention comprises n memory elements for shifting and storing an input signal in accordance with clock pulses, an adder for adding together the contents of the n memory elements, and a divider for dividing the added output from the adder by n.

DESCRIPTION OF THE PREFERRED EMBODIMENTS

Figure 1:
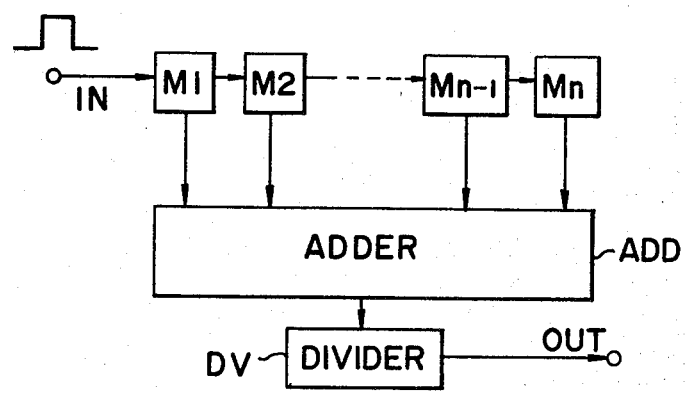
FIG. 1 is a block diagram illustrating the principal part of an embodiment of the present invention.

In FIG. 1 there is shown in block form the principal part of an embodiment of the present invention, in which memory elements M1 to Mn are cascade-connected to constitute a shift register, and an input signal applied to an input terminal IN is shifted by the memory elements M1 to Mn one after another upon each occurrence of a clock pulse. The n contents of the memory elements M1 to Mn are added together by an adder ADD, and the added output therefrom is divided by n in a divider DV to derive a converted signal from an output terminal OUT.

As the adder, an analog or digital adder is used depending on whether the input signal is analog or digital, and the adder is arranged to add together the outputs from the n memory elements M1 to Mn concurrently; to this end, various known circuit arrangements can be employed. It is also possible to adopt various known circuit arrangements can be adopted for the divider DV.

For example, if n=4, then the signal converter circuit comprises four memory elements M1 to M4, an adder ADD for adding together their stored values, and a divider DV for dividing the added output by 4. In the case where the input signal is a digital signal, the memory elements are formed by flip-flops, CCD's or the like, and use is made of an arrangement which has a bit capacity equal to the number of bits of the digital signal.

Figure 2:
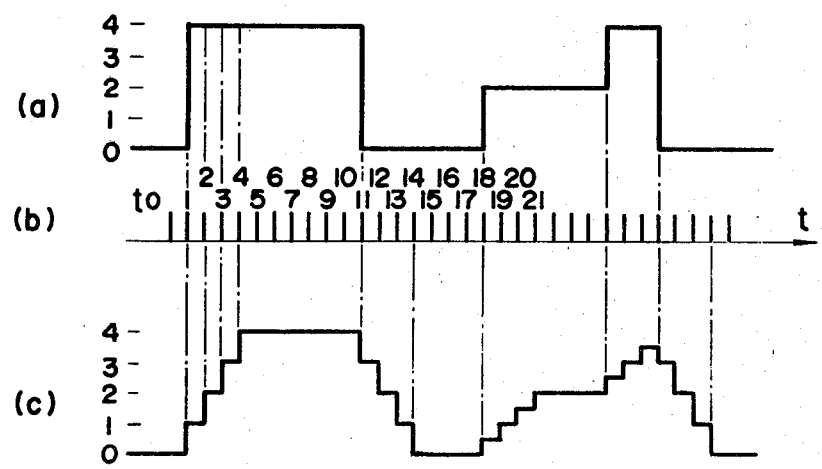
FIG. 2 is a diagram explanatory of the operation of the embodiment shown in FIG. 1.

FIG. 2 is explanatory of the operation of the embodiment shown in FIG. 1. As shown in FIG. 2(a), a signal representing the amount of movement is inputted in accordance with clock pulses depicted in FIG. 2(b). If n=4, as mentioned above, then "4" is written only in the memory element M1 at a moment t1 and the inputs to the other memory elements M2 to M4 are "0"; consequently, the added output from the adder ADD is "4", which is divided by 4 in the divider DV to provide an output signal "1". Since an input signal at a moment t2 is also "4", the stored content "4" of the memory element M1 is shifted to the memory element M2 and, at the same time, "4" is written in the memory element M1. An added output, 4+4+0+0=8, is obtained by the adder ADD and divided by 4 in the divider DV, to yield an output signal "2". In a similar manner, an output signal "3" is obtained at a moment t3, and an output signal "4" at a moment t4. Accordingly, an input signal that has changed from "0" to "4" is converted to an output signal having an amount of variation "1", which is ¼ of 4, in accordance with the clock pulse.

When the input signal changes from "4" to "0" at a moment t11, the content of the memory element M1 only is "0" and the contents of the other memory elements M2 to M4 are "4", and consequently an output signal "3" is yielded. At moments t12, t13, and t14 output signals "2", "1", and "0" are provided respectively.

In the case of an input signal "2" being applied at a moment t18, there are produced at moments t18 to t21 output signals which sequentially increase by steps of "0.5". Accordingly, the input signal shown in FIG. 2(a) is converted to an output signal shown in FIG. 2(c), that is, a signal having a small amount of variation; therefore, a movable machine part can be moved smoothly.

Figure 3:
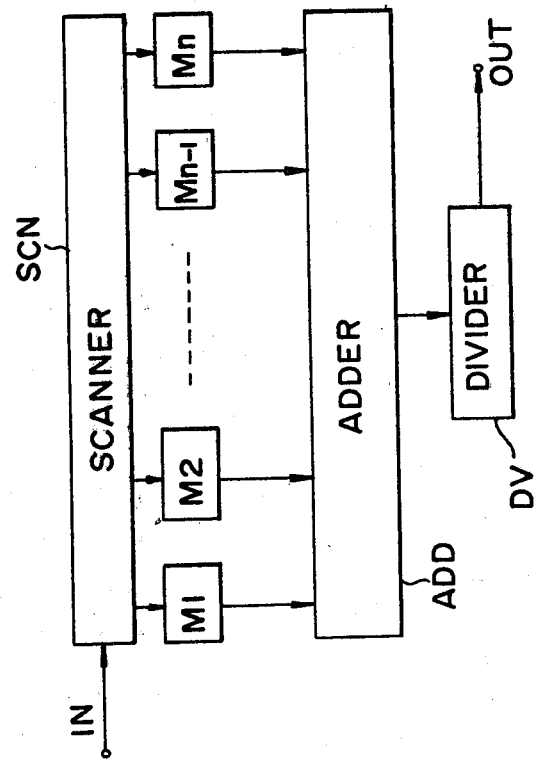
FIG. 3 is a block diagram illustrating the principal part of another embodiment of the present invention.

FIG. 3 illustrates in block form another embodiment of the present invention, in which parts corresponding to those in FIG. 1 are identified by the same reference characters. In FIG. 3, reference character SCN indicates a scanner. The signal applied to the input terminal IN is provided to the scanner SCN which scans the memory elements M1 to Mn in accordance with the clock pulses and input signal is written in the memory elements M1 to Mn one after another via the scanner SCN and held until it will be rewritten at the next timing. Accordingly, the output signal obtained by dividing the added output from the adder ADD by n in the divider DV becomes similar to the output signal obtainable in the embodiment of FIG. 1.

In the case where the input signal is an analog signal, analog memory elements are used as the memory elements M1 to Mn and, in the embodiment of FIG. 1, a delay circuit may also be employed. And, by the inputting of an analog signal of such a waveform as shown in FIG. 2(a), the resulting output signal has such a waveform as shown in FIG. 2(c) which varies by 1/n upon each occurrence of the clock pulse.

As described previously, even an input signal having a rapid change is converted to a signal having a smaller change as the number of memory elements M1 to Mn is increased; this ensures smooth acceleration and deceleration in the case of applying the output signal to a servo system to control the movable machine part, thus permitting highly accurate control.

As has been described in the foregoing, according to the present invention, an analog or digital signal representing the amount of movement in numerical control is written in the memory elements M1 to Mn one after another upon each occurrence of a clock pulse, the contents of the n memory elements M1 to Mn are added together and then the added output is divided down to 1/n, so that even if a signal representing a rapid change is inputted, a signal can be outputted which represents a change 1/n times the original change. Since the time intervals between individual processing for numerical control are long, a signal representing an abrupt change in the amount of movement can be converted to a signal of a gentle change for input to a servo system, enabling smooth movement of the movable machine part. The adder ADD and the divider DV can also be formed as a unitary structure. For example, in the case of $2^n$ memory elements being provided, the divider DV may be such an arrangement that shifts n bits, and consequently it is sufficient for the adder ADD only to add the contents of the memory elements having shifted thereto the n bits.

It will be apparent that many modifications and variations may be effected without departing from the scope of the novel concepts of this invention.

What is claimed is:

1. A signal converter circuit for receiving clock pulses and for converting an input signal, comprising:
n memory elements for sequentially having the input signal written therein in synchrony with the clock pulses, wherein n is an integer greater than 1;
an adder, operatively connected to said n memory elements, for adding together the contents of said n memory elements and for providing, as an output, an added result; and
a divider, operatively connected to said adder, for dividing the added result by n.

2. A signal converter circuit according to claim 1, wherein said n memory elements are cascade-connected to form a shift register.

3. A signal converter circuit according to claim 1, further comprising a scanner, operatively connected to said n memory elements, for scanning the input signal to write the input signal into said n memory elements.

4. A signal converter circuit comprising:
means for receiving an analog input signal;
an n-stage analog delay circuit, connected to said means for receiving said analog input signal, for sequentially shifting said analog input signal along said n stages of said analog delay circuit at a constant rate, where n is an integer greater than 1;
an analog adder, connected to each stage of said analog delay circuit, for adding together the respective values held in each said stage of said analog delay circuit repeatedly in synchrony with said constant rate and for generating an added output; and
a divider, connected to said analog adder, for dividing the added output by n.

5. A signal converter circuit comprising:
means for receiving a digital input signal;
means for receiving a clock signal;
an n-stage shift register, connected to said digital input signal receiving means and said clock signal receiving means, for shifting said digital input signal synchronously with said clock signal, where n is an integer greater than 1;
an adder, connected to each said stage of said n-stage shift register, for adding together the respective values held in each stage of said shift register and for generating an added output; and
a divider, connected to said adder, for dividing the added output by n.

6. The converter of claim 5, wherein n is an integral power of 2, and wherein said adder and divider are combined, said combined divider and adder both adding said respective stage values together and shifting the added value by k bits, where $n=2^k$.

* * * * *

UNITED STATES PATENT AND TRADEMARK OFFICE
CERTIFICATE OF CORRECTION

PATENT NO. : 4,368,433

DATED : JANUARY 11, 1983

INVENTOR(S) : RYOJI IMAZEKI ET AL.

It is certified that error appears in the above-identified patent and that said Letters Patent is hereby corrected as shown below:

Column 2, line 5, delete "can be adopted".

Signed and Sealed this

Seventeenth Day of May 1983

[SEAL]

Attest:

DONALD J. QUIGG

Attesting Officer    Acting Commissioner of Patents and Trademarks